Figure 7:
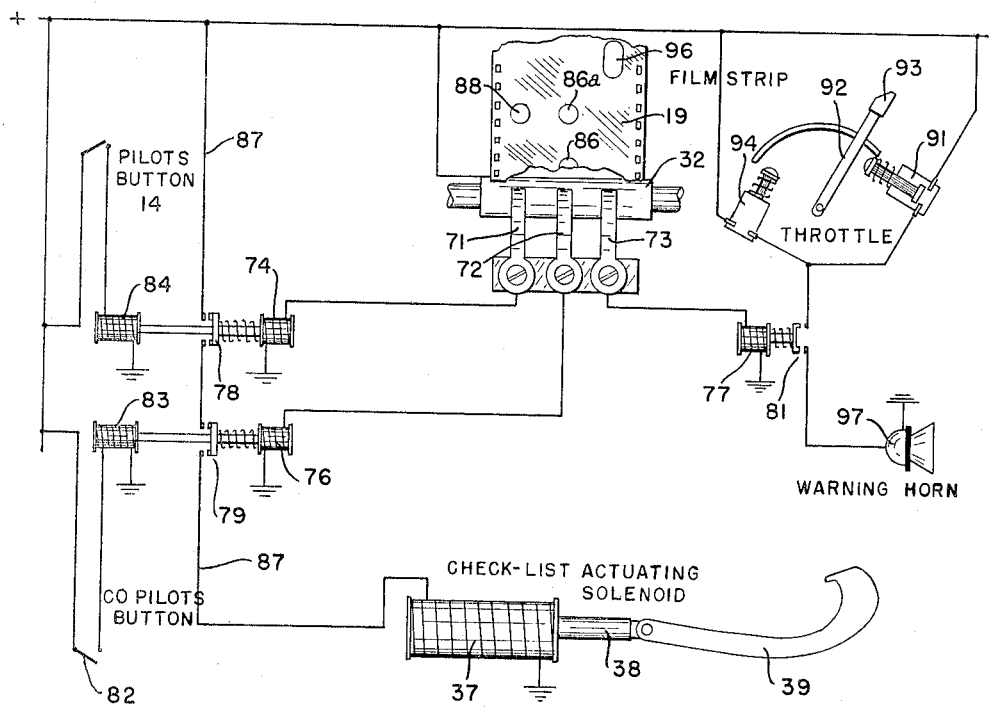

Sept. 20, 1955 W. W. BARTLETT ET AL 2,718,628
CHECK LIST DISPLAY DEVICE
Filed April 14, 1952 3 Sheets-Sheet 1

INVENTORS
Woodrow W. Bartlett
& Rex L. Pilling
BY
*CBMessenger*
ATTORNEY

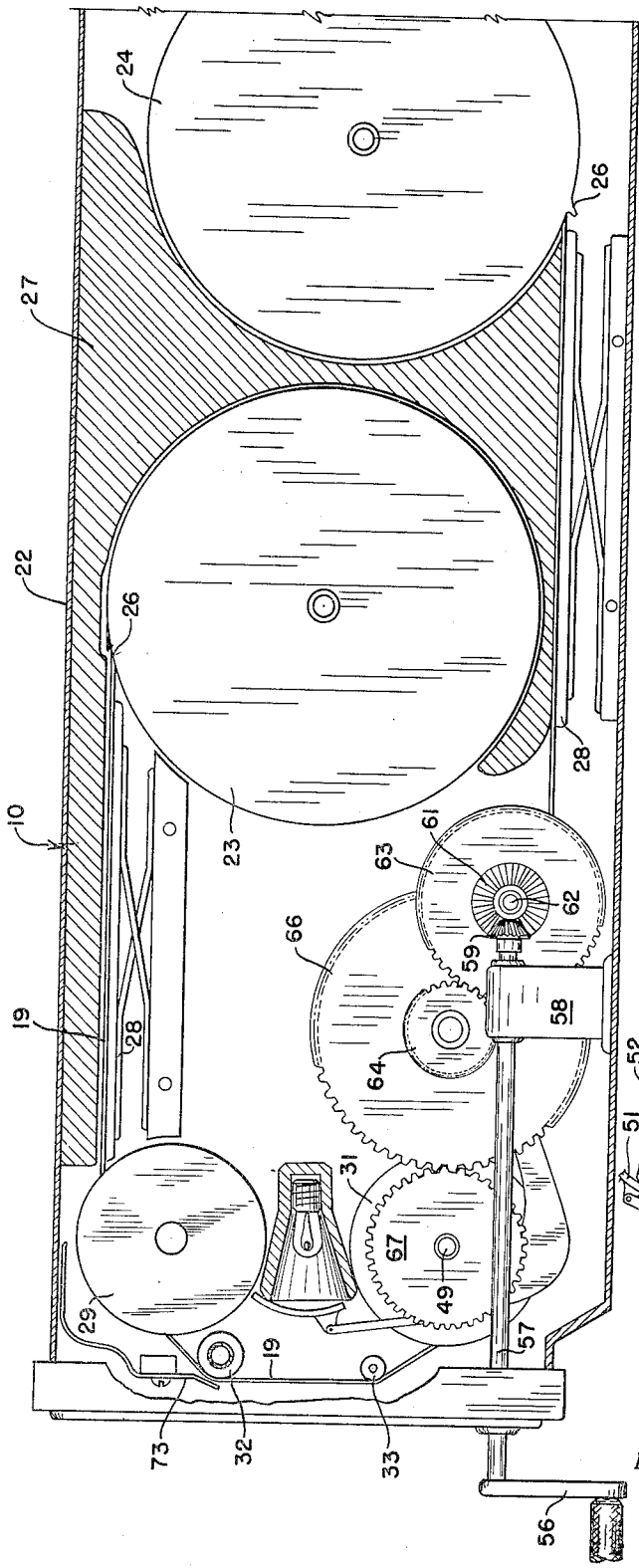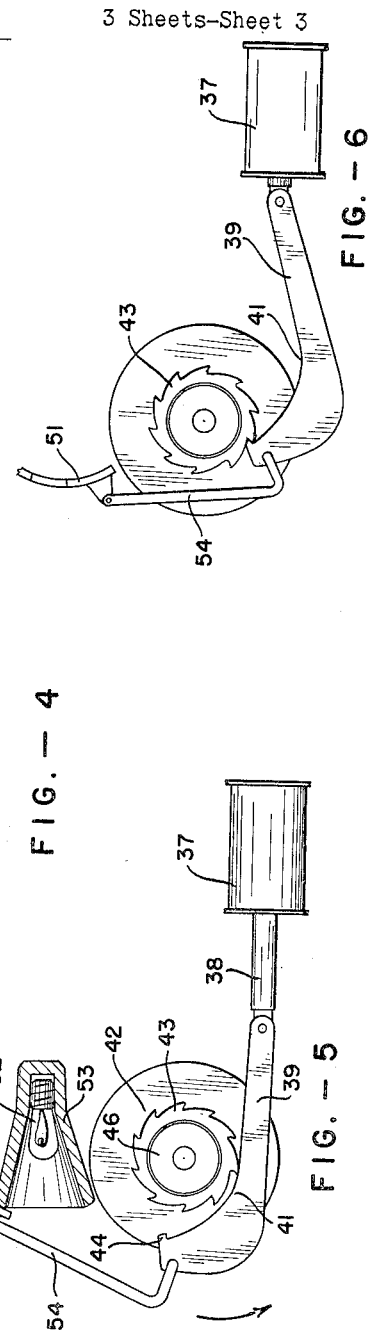

United States Patent Office 2,718,628
Patented Sept. 20, 1955

2,718,628

CHECK LIST DISPLAY DEVICE

Woodrow W. Bartlett, West Yellowstone, Mont., and Rex L. Pilling, Denver, Colo.

Application April 14, 1952, Serial No. 282,248

8 Claims. (Cl. 340—27)

The present invention relates to a mechanism for visually displaying the separate items of an aircraft procedural check list to the view of selected members of the aircraft flight crew in such a manner as to assure compliance with the prescribed check-list procedure.

Because of the great number of manipulations and observations that must be made in order to assure safe and efficient operation of today's complicated types of aircraft, it has long been recognized that it is necessary to provide some means of calling the various desired manipulations and observations to the pilot's attention. In general, it is customary to provide a check list made up of a considerable number of items presented in sequential order such that compliance with the check list will assure correct operation of the aircraft. These check lists have proved to be a great aid to the aircraft flight personnel, but because of the usual cumbersome presentation of the check list on multiple or single sheets of paper or on display boards or the like, the full advantage of check-list operation has not yet been realized.

In present day aircraft where a great number of instruments and separate controls are used, the pilot's attention cannot be diverted from the regular and necessary physical manipulations and visual observations required during flight operation without a loss in efficiency. Accordingly, the use of check lists of the present type adds to the confused and overly busy nature of cockpit operation. Being appreciative of the advantage of operating aircraft in accordance with a predetermined check-list procedure, and being fully cognizant of the operational and manipulative difficulties inherent in following a check-list procedure as now presented on a typed or printed sheet or by various display devices, the present inventors have developed a display device particularly adapted to present the separate items of desired check-list procedures in their correct consecutive or serial arrangement, so that these check-list items may be observed, read and acknowledged separately before the next item of the check list is presented for their attention. Further realizing that a check-list procedure will add to the efficiency of flight operations only if it is fully observed, the present inventors have designed their herein-described device so that each of the separate check-list items must be acknowledged by one or more of the flight crew personnel in accordance with a predetermined schedule for such acknowledgements before the next item is displayed.

In order to provide a mechanism for the display of check-list items in a manner that will be fully satisfactory and highly desirable for use in present day aircraft, the inventors of the device disclosed herein have set out to satisfy the aims and objectives set forth above as well as the following objectives:

To provide two separate control means for use in conjunction with a display device adapted so that the control means must be energized by a physical acknowledgement on the part of one or more of the flight crew personnel before the next item on the check list will be displayed.

To provide a device of the foregoing type in which means is provided on the check-list carrying element to indicate whether such check-list item must be acknowledged by one or more than one of the flight crew personnel.

To provide a check list, the separate items of which are arranged consecutively on a strip film member for individual presentation to an observer's view.

To provide a display device adapted ot receive a strip film member having the items of the check list impressed serially thereon, in which the display device incorporates a drive mechanism for moving the strip member a regulated distance for each cycle of operation of the drive mechanism. Further to provide a mechanism of the foregoing type in which the drive mechanism is electrically operated. Likewise to provide a mechanism in which operation of a control solenoid is controlled by an observer of the device.

To provide a display device in which a strip film member is adapted to pass a display opening in the device and in which a drive mechanism is utilized to move the strip film member regulated increments of distance past the display opening when the drive mechanism is energized selectively by physical manipulation of one or more observers as predetermined by indexing means carried by the said strip film.

Among the further objects of the present invention is to provide a drive mechanism for manually selecting a desired check-list procedure from among several check-list procedures presented on a strip member within the display device; to provide novel drive means for moving a strip member regulated increments of distance through a display device; to provide novel drive means of the foregoing type incorporating a cam action for controlling illumination of the strip member; to provide a display device utilizing a solenoid operated drive mechanism in which actuation of the solenoid is governed selectively and/or conjointly by manipulation of a control member external of the display device and by an indexing mechanism within the device; to provide a strip film member having separate items of the check list presented at spaced positions thereon for observation and having a plurality of indexing serrations or openings on the film for controlling actuation of a drive mechanism that moves the strip film past the point of visual display.

Further to provide a check-list display mechanism incorporating safety features designed to assure compliance with all the items of the pertinent check-list procedure before take-off or landing.

Figure 8:
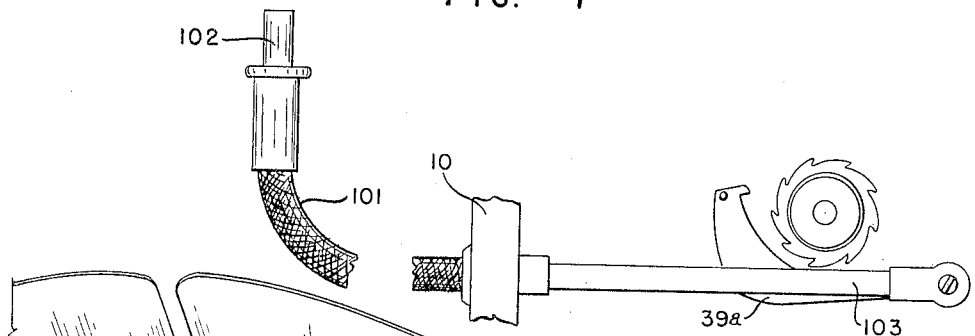
Figure 1:
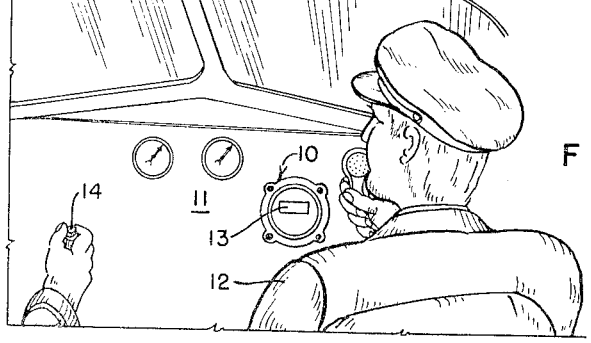
Figure 3:
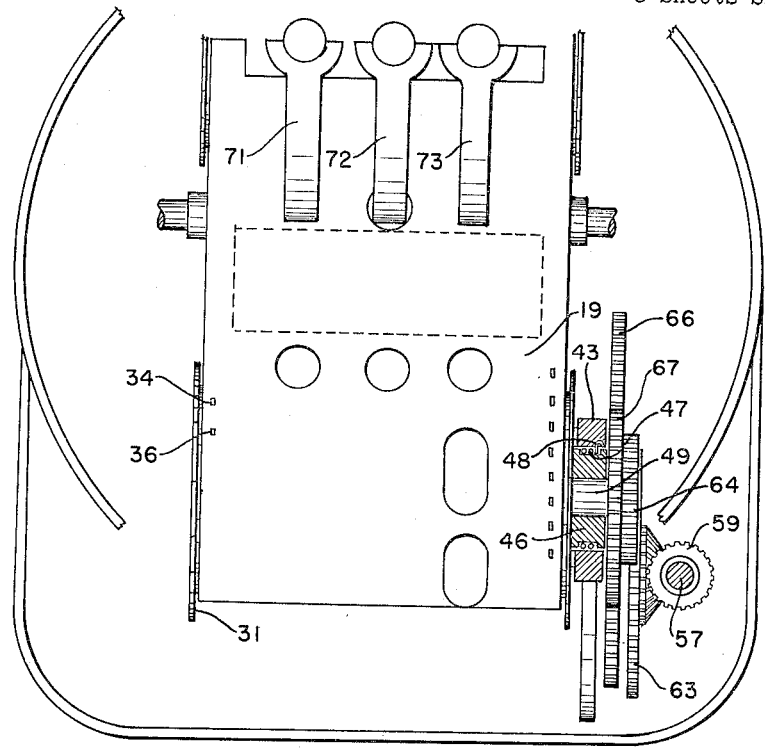
Figure 2:
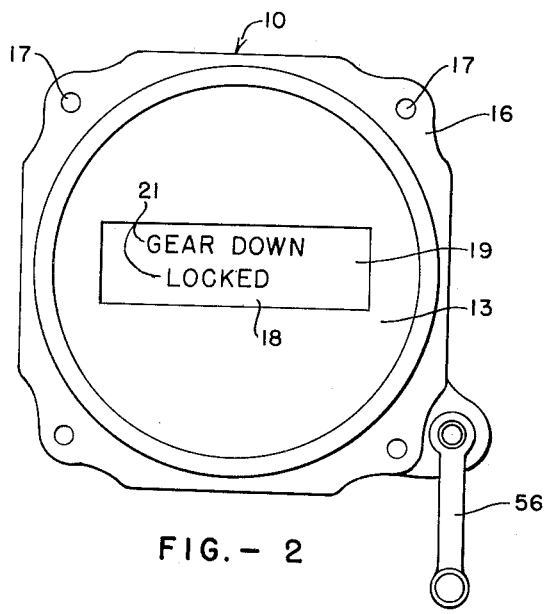

Further objects and advantages of the present invention will be apparent from the appended description and drawings, in which Fig. 1 is a pictorial view showing the manner of use of the present invention, Fig. 2 is a front elevation showing a desired embodiment of the present invention, Fig. 3 is a front elevation in partial section showing some of the operative features of the present invention, Fig. 4 is a side elevation in partial section showing further details of the present invention, Fig. 5 is an elevation showing details of a drive mechanism utilized, Fig. 6 is an elevation showing the drive mechanism of Fig. 5 in alternate position, Fig. 7 is a schematic diagram showing one form of electrical control utilized in accordance with this invention, and Fig. 8 is a fragmentary elevation showing details of a separate type of drive mechanism energizing means.

Briefly stated, the present invention provides a device for consecutively displaying the separate items of a check list to the view of the pilot, copilot or other flight crew members as desired. In addition to incorporating means for moving a strip member which carries the check list items regulated increments of distance such that these items will be separately displayed, the mechanism further includes means for moving the strip member this regulated increment of distance only after the check-list item has been acknowledged by the pilot or copilot or by both the pilot and copilot in accordance with a predetermined schedule for such acknowledgments. Accordingly, if an item is of minor importance, the copilot alone may cause movement of the strip member to display the next item; however, if the item is of major importance, it will be necessary for both the pilot and copilot to acknowledge completion of the check-list item before passing on to the next succeeding item in the prescribed procedure.

In addition to the foregoing features, the present invention includes various safety and warning devices designed to make operation in accordance with the check list mandatory, so that none of the check-list items will be avoided by flight crew personnel.

Referring now to the drawings, Fig. 1 shows a preferred manner of use for the display device of the present invention in which the display device 10 is mounted on the instrument panel 11 of an aircraft in a position of visual prominence, so that it may be seen by the copilot 12, or by the pilot, sitting in their normal positions in the cockpit. When placed in such a position the copilot may readily observe the separate check-list items displayed on the face 13 of the display device 10. He may then announce the check-list item to the pilot or other crew members to assure completion of the desired procedure. Where minor manipulations or observations are called for by the check-list item, the copilot may acknowledge compliance with such check-list item by pressing a control button (not shown) located on his microphone or at some other convenient place. For minor items this manipulative acknowledgment by the copilot is effective to change the check-list item displayed, so that he may read the next item appearing on the face 13 of the display device 10. Where it is necessary that the pilot likewise acknowledge completion of the displayed check-list item, he may do so by pressing a button 14 that should be conveniently placed for his use. The full mechanism for making such selective and multiple control possible will be later described in conjunction with other figures appended hereto; however, it is felt that this preliminary discussion of the operative procedure will be of advantage in describing the features shown and described herein.

Fig. 2 merely shows a front elevation of a desired type of mounting for the display device 10 of this invention. Since all aircraft instruments are standardized, and since the instrument panel of present day types of aircraft is adapted to receive such standardized instruments, it is highly desirable that the display device of this invention should be adapted for incorporation in a structure corresponding to the structure for ordinary aircraft instruments. In Fig. 2 the front of the display device 10 has the shape and form of an ordinary aircraft instrument. Accordingly, the flanges 16 are to be utilized for engagement with the front surface of the instrument panel 11, and the attaching screws 17 are adapted to hold the device in such instrument panel. The face 13 of the device 10 is provided with a display opening 18 through which the strip film 19, which carries the separate check-list items, may be observed.

Figs. 3 and 4 show a preferred type of actuating and drive mechanism that is utilized to move the strip film 19 past the display opening 18.

Since the check-list procedures for larger types of aircraft may include even more than a hundred separate items, it is obvious that the strip film 19 must be of a considerable length. Accordingly, the support structure 22 of the display device 10 provides a space in the rear most portions thereof adapted to receive film containers 23 and 24, into which the film 19 may be introduced and from which the film 19 may be removed as desired. These film containers 23 and 24 are of generally cylindrical shape and of a width slightly greater than the strip film 19. A slit opening 26 is provided in the wall surface of the cylindrical containers 23 and 24, so that the film 19 may be passed into and out of the containers. Although winding spools may be provided for holding the strip film, it is intended that there will be no spools used in conjunction with the containers 23 and 24 as shown Preferably the film will be allowed to coil upon itself after passing along the inner surface of the container. In order to assure correct positioning of the containers guide and support members 27 may be provided to receive and hold the containers 23 and 24 in their desired positions.

To prevent buckling of the film strip 19 adjacent the entrance slit 26 of the containers, it is desirable that spring guides 28 be positioned to lightly engage the film strip between the containers 23 and 24 and winding spools 29 and 31. In the embodiment shown in Figs. 3 and 4 the strip film 19 is guided from the container 23 along the spring guide 28 toward an idler spool 29, and thence over a contact pin 32 and guide pin 33 before passing over drive spool 31. As shown in Fig. 3 the strip film 19 is preferably provided with a plurality of openings 34 adjacent its lateral edges, so that the teeth 36 of a sprocket (not shown) on the drive spool 31 may come into meshing and driving engagement with the openings 34. With this arrangement it will be observed that rotation of the drive spool 31 will cause movement of the strip film 19 past the display window 18 of face 13.

If the drive spool 31 is driven in a counterclockwise direction, as seen in Fig. 4, the strip film 19 will be moved out of the container 23 and toward and into the container 24. If the check-list items presented on the strip film 19 are arranged consecutively or serially one after another in accordance with this direction of movement, counterclockwise movement of the drive spool 31 will present the check-list items for visual observation in their correct order.

Preferably the check-list items will be spaced on the strip film 19 equal distances apart, so that in effect the check-list items will be presented in much the same manner as the separate frames of a motion picture film. With equal spacing of the separate items a mechanism can be provided to move the film an increment of distance corresponding to the distance between the check-list items.

A mechanism for accomplishing this equidistant movement of the strip film is shown in Figs. 3 through 6. This mechanism includes an actuator or solenoid 37 in which the solenoid armature 38 is connected to a cam pawl 39, the upper surface 41 of which is adapted for engagement with the teeth 42 of a ratchet drive 43 during initial movement of the solenoid armature. As movement of the armature 38 continues, the catch tooth 44 of cam pawl 39 engages the teeth 42 of ratchet drive 43 such that further movement of the armature 38 will cause rotation of the ratchet drive 43. This rotational movement of the ratchet drive 43 is transmitted to a spool member 46, upon which the ratchet 43 is rotationally mounted, by means of a coil spring clutch 47 wound about the spool 46 and having one hook end 48 attached to the ratchet 43. Since the spool 46 is attached to shaft 49, and further since the shaft 49 is attached to the drive spool 31, rotation of the ratchet 43 in a counterclockwise direction will cause rotation of the drive spool 31 in the same direction. Further, since the length of throw of the solenoid armature 38 may be controlled, rotational movement of the drive spool 31 may likewise be controlled to give the desired movement of the strip film 19.

A further feature of the drive mechanism shown in Figs. 5 and 6 is embodied in the fact that cam pawl 39 not only rotates the ratchet 43, but it also controls a shutter member 51, so that the illumination from light 52 and reflector 53 may be interrupted whenever the strip film 19 is being moved. This feature is incorporated in the present design, because of the fact that while illumination is desirable for purposes of observing the check-list items on the strip film, any flashing light in the interior of the aircraft cockpit is highly undesirable. Accordingly, the mechanism shown is intended to cut off illumination from the light 52 whenever the strip film 19 is being moved. This highly desirable function is accomplished during initial movement of the solenoid armature 38 and cam pawl 39. During this initial movement the interior cam surface 41 of pawl 39 engages the ratchet teeth 42, and such engagement forces pawl 39 downwardly in the direction of the arrow shown in Fig. 5. Since pawl 39 is connected to shutter 51 by means of the link arm 54, the shutter 51 will be moved downwardly to the position shown in Fig. 6 whenever the solenoid 37 is actuated. When the solenoid is released, cam pawl 39 and shutter 51 will return to their positions as shown in Fig. 5, so that the new check-list item will be illuminated for viewing by the light 52.

In larger aircraft it has been found desirable to provide check lists for several different operations and procedures. Accordingly, a check list is provided for initial starting and warming of engines, for pre-flight check, for take-off, for various checks en route, for pre-landing, for landing and for other purposes. Each of these check lists may include a considerable number of items, and accordingly any strip presentation of the total number of possible check items is bound to be quite long. For this reason, the mechanism described, which moves the strip one frame or check item at a time would not be adequate for all purposes. In addition to the mechanism described, it is highly desirable that some means be provided for selecting the desired check-list procedure.

A drive mechanism for accomplishing this purpose is shown in Figs. 2, 3 and 4, wherein it may be noted that a crank handle 56 is provided to rotate a shaft 57 journaled in support 58 and having a bevel gear 59 on its inner most end. Bevel gear 59 meshes with bevel gear 61 to rotate shaft 62 and intermediate gear 63. Gear 63 meshes with pinion gear 64 to rotate gear 66. Gear 66 in turn meshes with gear 67, which is attached to shaft 49. As previously noted, rotation of shaft 49 causes rotation of drive spool 31. Accordingly, whenever the crank arm 56 is rotated, drive spool 31 will likewise be rotated. Because of the substantial gear reduction, drive spool 31 may be rotated at a relatively high speed through use of the hand crank 56. Accordingly, strip film 19 may be reeled in or out readily to locate the desired check-list procedure. Once such check-list procedure is located, the ratchet drive may then be utilized to move the items of the described check list past the diplay opening 18. During rotation of the drive spool 31 by means of the hand crank 56, the ratchet drive mechanism will be inoperative, since the spring clutch 47 is operative only when the ratchet drive mechanism is being operated in a relatively counterclockwise direction with respect to the spool 46.

As previously stated, it is desirable that certain check-list items be acknowledged by only one member of the flight crew; however, other check-list items are concerned with relatively more important flight operations, and accordingly, it is advisable that both the pilot and copilot or pilot and flight engineer be cognizant of such check-list operation. Where the copilot has responsibility for any prescribed check-list procedure, the actuating solenoid 37 should be controlled solely by the copilot's actuating button; however, for the more important check-list procedures, it is necessary that both pilots acknowledge such item, and accordingly, some acknowledgement or manipulation by each of the pilots should be required before the actuating solenoid can move the check-list to the next succeeding item. An arrangement for effecting such separate and/or conjoint control for the solenoid actuation is shown in Fig. 7. As shown in this figure and partially in Figs. 3 and 4, a plurality of contact fingers 71, 72 and 73 are positioned so that they would normally contact the contact pin 32 if the strip film 19 was removed therefrom. Accordingly, an electrical circuit could be passed through the contact 32 and through the contact fingers 71, 72 and 73 for control purposes. This contact and pick-up arrangement is utilized by the present inventors in conjunction with the check-list items shown on the film strip in order to control the desired actuation of the solenoid 37.

As shown in Fig. 7 the contact fingers 71, 72 and 73 are respectively connected to control solenoids 74, 76 and 77. Each of these control solenoids 74, 76 and 77 is effective when energized to open normally closed spring-biased switches 78, 79 and 81. Accordingly, whenever a current is passed through the corresponding contact fingers, the electrical circuits through these switches 78, 79 and 81 will be broken, whereas if no current passes through the contact fingers and the associated solenoids 74, 76 and 77, the circuits through the switches 78, 79 and 81 will be closed. By providing the copilot and pilot with control buttons 82 and 14 respectively that are connected to solenoids 83 and 84, the desired actuating features for solenoid 37 may be obtained.

The operation would be as follows: If a certain check-list item is to be accomplished and acknowledged only by the copilot, a hole 86 is placed in the strip film 19. When this hole 86 passes over the contact pin 32, finger 72 will make contact with the pin 32 through the opening 86, solenoid 76 will be energized and switch 79 will be opened. In order for current to pass to the actuating solenoid 37, this switch 79 must be closed. Accordingly, the copilot may actuate the solenoid 37 by pressing his button 82 to thereby energize solenoid 83, which is of greater strength than solenoid 76, thereby closing the circuit through lead 87 to the solenoid 37. If subsequently, as shown, the next check-item is to be acknowledged by both the pilot and copilot, openings 86a and 88 are provided in the film strip 19. As both of these openings pass over the contact pin 32, circuits will be closed through the fingers 71 and 72 to energize the solenoids 74 and 76 thereby opening switches 78 and 79. In order to close these switches and complete the circuit through lead 87 to the solenoid 37, both the pilot's button 14 and the copilot's button 82 must be pressed to energize the solenoids 84 and 83 and to close the switches 78 and 79.

The take-off and landing check lists are of especial importance, and accordingly it is desirable that these check-list procedures be followed closely, and further that the procedures be completed before landing and take-off. As a safety feature to prevent inadvertent landing or taking off before completion of the check-list procedure, the present inventors find it desirable to provide a warning system that will indicate whether or not these procedures have been completed before the throttle is advanced for take-off or pulled back for landing. The system utilized includes a contact switch 91 positioned on the throttle quadrant 92, so that the throttle 93 will engage and close the circuit 91 when the throttle is advanced. A similar switch 94 is provided so that a circuit will be completed through the switch 94 when the throttle 93 is retarded.

Openings 96 are provided in the film strip 19 at positions in alignment with finger 73 only at the end of the take-off and landing check lists. Accordingly, if the take-off check list is completed, the opening 96 will be in registration with contact finger 73 and contact pin 32. Under this condition a circuit will be closed through the finger 73 to energize solenoid 71 and open switch 81. When the switch 81 is open, the throttle may be advanced to close the switch 91 without completing the circuit to the warning horn 97. However, if the check list is not completed, the circuit through contact finger 73 will not be completed, both switches 81 and 91 will be closed when the throttle is advanced, and the warning horn 97 will blow to warn the pilot of the fact that the check list has not been completed. At the time of landing similar results will be obtained when the throttles are retarded if the landing check list has not been completed, so that a corresponding opening 96 is in registration with the contact finger 73 and contact pin 32.

While the electrical drive control device described is highly desirable, it is realized that the present invention is also adaptable for use in small types of aircraft. For use in small aircraft, it is believed that it might be expedient or desirable to provide a manually operated type of drive mechanism. A modification of the present invention is shown in Fig. 8 which will facilitate mechanical operation of the mechanism shown in Figs. 3 and 4. In accordance with this modification a flexible shaft 101 is interconnected to the display device 10, so that a control button 102 on the shaft 101 may be pressed to transmit translational movement to a push rod 103 which is in turn connected to cam pawl 39a. When the control button 102 is pressed, movement of the cam pawl 39a will be similar to the movement of cam pawl 39 as previously described.

It should further be realized that where it is desirable to provide automatic selection of separate check-list procedures the drive mechanism shown in Figs. 3 and 4 may be interconnected with a drive motor (not shown) to speedily wind the strip film past the view point. Further, additional openings may be provided in the strip film for registration with an additional pick-up finger such as finger 71 that is connected in the energizing circuit of such motor to stop the film when the desired check list is in position for view.

While separate embodiments of this invention have been shown and described, it is readily apparent that the invention is adaptable to various other modifications and changes that are well within the scope of the present invention. All such modifications and changes as come within the scope of the hereunto appended claims are deemed to be a part of this invention.

What is claimed is:

1. A display device for aircraft comprising a closed support structure adapted to be mounted in an aircraft at positions of visual prominence, a strip member for use in conjunction with said device having a plurality of items of desired intelligence displayed thereon, each item being spaced from adjacent items in serial arrangement, a member for exposing the items on said strip member to the view of selected aircraft flight crew personnel, means for supporting and guiding said strip member along a pathway to facilitate exposure, drive means for moving said strip member along said path, and separate control means for at least two members of the flight crew for selectively and conjointly energizing said drive mechanism, said strip member providing index means associated with the separate items of displayed intelligence for determining whether operation of said drive mechanism shall be selectively controlled by one of said separate control means or conjointly controlled by more than one of said control means.

2. A display device for aircraft comprising a closed support structure adapted to be mounted in an aircraft at positions of visual prominence, a strip member for use in conjunction with said device having a plurality of items of desired intelligence displayed thereon, each item being spaced from adjacent items in serial arrangement, a member for individually and separately exposing the items on said strip member to the view of selected aircraft flight crew personnel, means for supporting and guiding said strip member along a pathway to facilitate exposure, drive means for moving said strip member along said path, and separate control means for at least two members of the flight crew for selectively or conjointly energizing said drive mechanism, said strip member providing index means associated with the separate items of displayed intelligence for determining whether operation of said drive mechanism shall be selectively controlled by one of said separate control means or conjointly controlled by more than one of said control means.

3. A display device for aircraft comprising a closed support structure adapted to be mounted in an aircraft at positions of visual prominence, a strip member for use in conjunction with said device having a plurality of items of desired intelligence displayed at spaced positions in serial arrangement thereon, a lens for separately exposing the items on said strip member to the view of selected aircraft flight crew personnel, guide spools for supporting and guiding said strip member along a pathway past said lens to facilitate exposure, drive means connected to one of said spools for moving said strip member along said path an increment of distance corresponding to the spacing of said items, and separate control means for at least two members of the flight crew for selectively and conjointly energizing said drive mechanism, said strip member providing index means associated with the separate items of displayed intelligence for determining whether operation of said drive mechanism shall be selectively controlled by one of said separate control means or conjointly controlled by more than one of said control means.

4. A display device for aircraft comprising a closed support structure adapted to be mounted in an aircraft at positions of visual prominence, a strip member for use in conjunction with said device having a plurality of items of desired intelligence displayed thereon, each item being spaced from adjacent items in serial arrangement, and said strip member providing index means associated with the separate items of displayed intelligence, a member for exposing the items on said strip member to the view of selected aircraft flight crew personnel, means for supporting and guiding said strip member along a pathway to facilitate exposure, drive means for moving said strip member along said path, separate control means for at least two members of the flight crew for selectively and conjointly energizing said drive mechanism, and electrical pick-up means operative on contact with said index means for determining whether operation of said drive mechanism shall be selectively controlled by one of said separate control means or conjointly controlled by more than one of said control means.

5. A display device for aircraft comprising a closed support structure adapted to be mounted in an aircraft at positions of visual prominence, a strip member for use in conjunction with said device having a plurality of items of desired intelligence displayed thereon, each item being spaced from adjacent items in serial arrangement and said strip having a plurality of control openings therein at positions adjacent said items of intelligence, a member for exposing the items on said strip member to the view of selected aircraft flight crew personnel, means for supporting and guiding said strip member along a pathway to facilitate exposure, drive means for moving said strip member along said path, separate control means for at least two members of the flight crew for selectively and conjointly energizing said drive mechanism, and electrical pick-up means for use with the control openings in said strip member for determining whether operation of said drive mechanism shall be selectively controlled by one of said separate control means or conjointly controlled by bore than one of said control means.

6. A display device for aircraft comprising a closed support structure adapted to be mounted on the instrument panel of an aircraft, a strip film member for use in said device having a plurality of separate items of intelligence displayed on the spaced frames of said strip film, guide spools for directing said film through the device along a pathway, a reflector member, a view member adjacent said film disposed intermediate said pathway, a light source within said reflector and disposed behind said film and view member for illuminating said view member, solenoid operated drive means for moving said strip film along the pathway, and a reciprocal shutter positioned for movement into engagement with said reflector and interconnected with said solenoid drive means for cutting off the illumination of said view member by said light source while the drive means is energized to move said film thereby preventing a flashing light in said aircraft.

7. A display device for aircraft comprising a closed support structure adapted to be mounted on the instrument panel of an aircraft, a strip film member for use in said device having a plurality of separate items of intelligence displaced on the spaced frames of said strip film, guide spools for directing said film through the device along a pathway, a view member adjacent said film disposed intermediate said pathway, a light source disposed behind said film and view member for illuminating said view member, reciprocal pawl and ratchet drive means for moving said strip film along the pathway, a shutter for cutting off the illumination of said view member and cam means associated with said drive means and interconnected with said shutter for reciprocally moving said shutter in front of said light source while the drive means is energized to move said film thereby preventing a flashing light in said aircraft.

8. A display and warning device for aircraft comprising a closed support structure adapted to be mounted in an aircraft at positions of visual prominence, a strip member for use in conjunction with said device having a plurality of items of desired intelligence displayed thereon, each item being spaced from adjacent items in serial arrangement and groups of said items being likewise spaced from other groups of said items, said groups corresponding to procedures during operation of said aircraft, said strip member providing index openings after the last item of selected groups, a member for exposing the items on said strip member to the view of selected aircraft flight crew personnel, means for supporting and guiding said strip member along a pathway to facilitate exposure, drive means for moving said strip member along said path, separate control means for at least two members of the flight crew for selectively and conjointly energizing said drive mechanism, a warning horn on said aircraft, actuator switches for said horn positioned adjacent a control member of said aircraft, and electrical pickup means interconnected with said warning horn and actuator switches and positioned for contact through the openings in said strip member interconnected to assure sounding of said warning horn if said aircraft control member is moved into contact with the actuator switches before said electrical pickup means make contact through the openings in said strip member.

References Cited in the file of this patent

UNITED STATES PATENTS

| | | |
|---|---|---|
| 1,236,565 | Habschmitt, Jr. | Aug. 14, 1917 |
| 1,580,286 | Cloud | Apr. 13, 1926 |
| 1,690,244 | Periale | Nov. 6, 1928 |
| 1,708,533 | Bettini | Apr. 9, 1929 |
| 2,259,123 | Wells et al. | Oct. 14, 1941 |
| 2,262,756 | Clexton | Nov. 18, 1941 |
| 2,292,392 | Miller | Aug. 11, 1942 |
| 2,435,907 | Schirokauer | Feb. 10, 1948 |
| 2,599,392 | Kille | June 3, 1952 |
| 2,600,132 | Seaton | June 10, 1952 |